United States Patent
Slomito

[15] 3,675,972
[45] July 11, 1972

[54] STONE SLOTTING MACHINE

[72] Inventor: Joseph T. Slomito, R.R. 11, Box 60, Bloomington, Ind. 47401

[22] Filed: Jan. 8, 1971

[21] Appl. No.: 104,900

[52] U.S. Cl. .................................. 299/41, 125/12, 125/16, 299/15, 299/89
[51] Int. Cl. ..................................... E21c 31/04, E21c 41/12
[58] Field of Search ........................... 299/41, 53, 54, 89, 15; 125/12, 16

[56] References Cited

UNITED STATES PATENTS

| 207,374 | 8/1878 | Webster | 299/41 |
|---|---|---|---|
| 2,127,066 | 8/1938 | McCullough | 299/53 X |
| 2,695,164 | 11/1954 | Arentzen | 299/89 X |

FOREIGN PATENTS OR APPLICATIONS

| 10,120 | 0/1885 | Great Britain | 299/54 |

*Primary Examiner*—Ernest R. Purser
*Attorney*—Woodard, Weikart, Emhardt & Naughton

[57] ABSTRACT

A machine for cutting slots into stone. An arbor frame having cutting cylinders rotatably mounted along its edge is pivotally mounted to a carriage movably mounted on a rail. A motor is mounted on the frame and is operable to rotate the cutting cylinders. A second motor and converter mechanism is mounted on the carriage and is operable to reciprocate the arbor with respect to the carriage. Water pipes and suction pipes are mounted to the frame to wash the cutting cylinders and remove the slush formed thereby. Rollers are also mounted to the frame for abutting the sides of the stone slot. One of the cutting cylinders is spring loaded being mountable to the bottom of the arbor.

6 Claims, 5 Drawing Figures

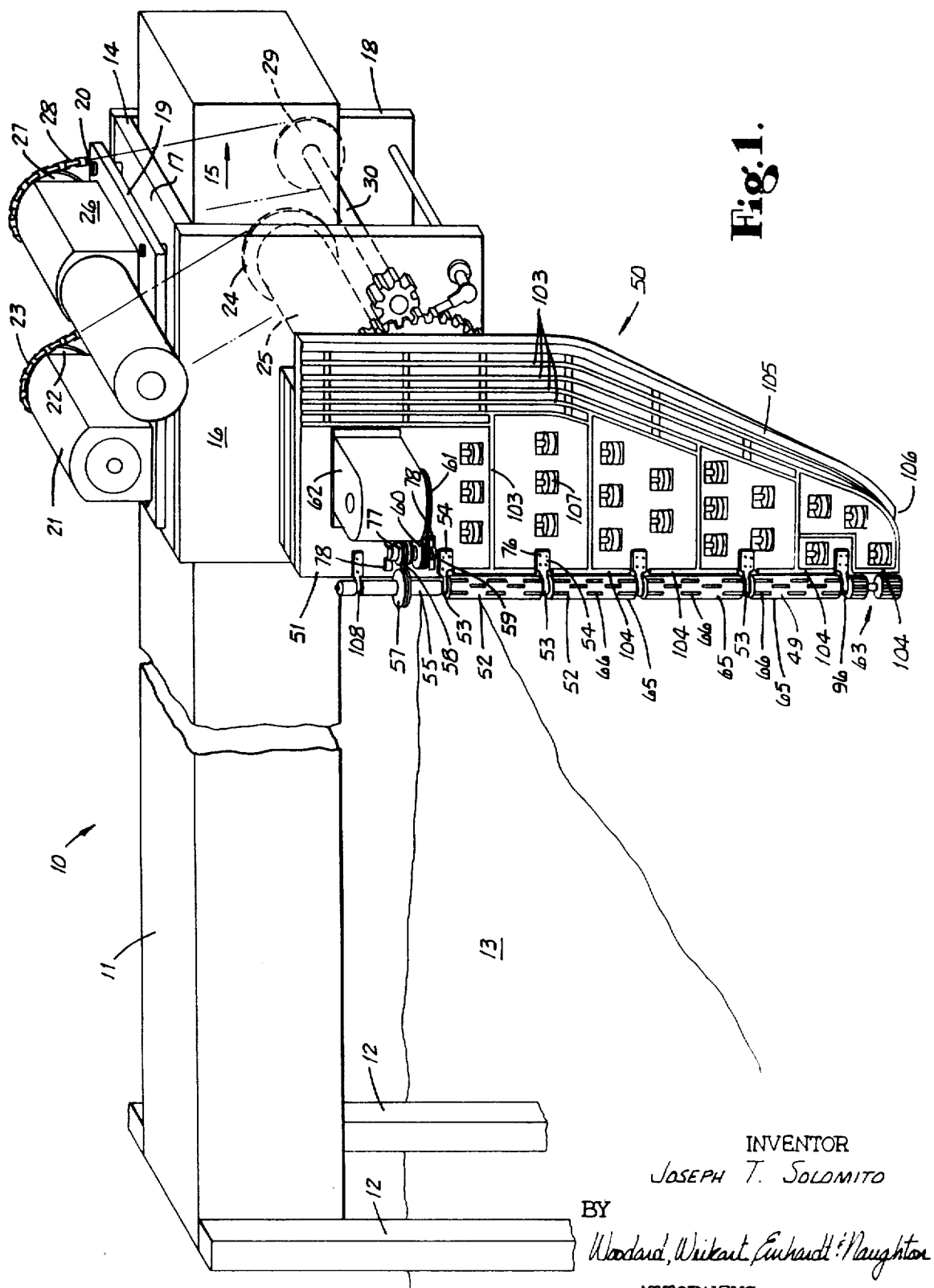

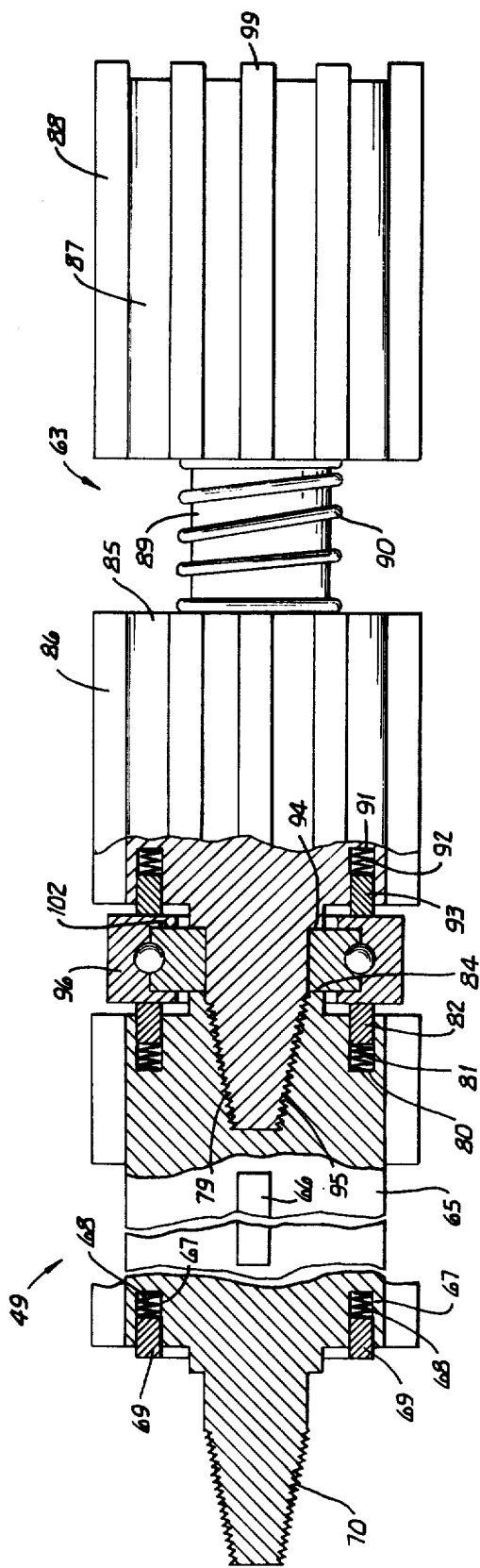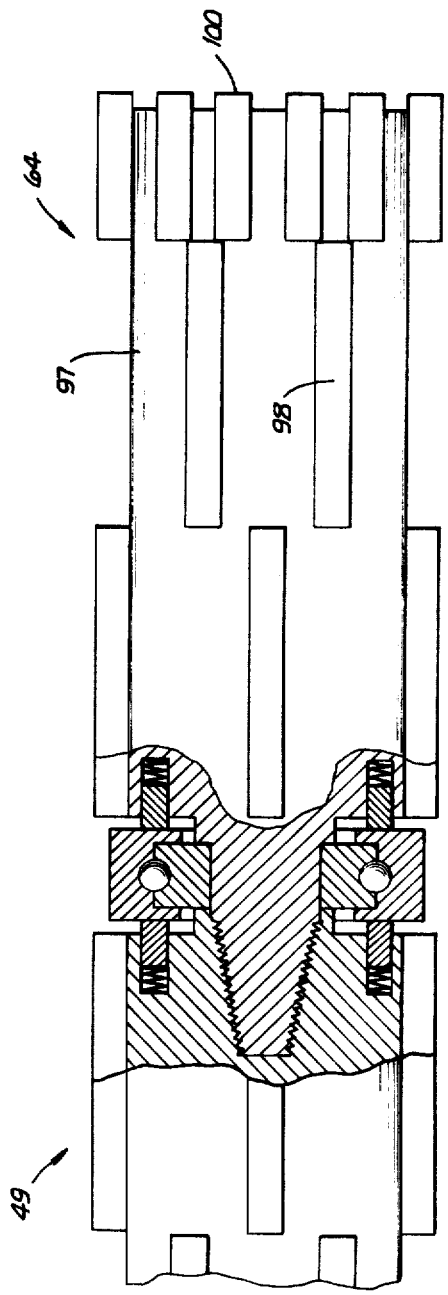

INVENTOR
Joseph T. Solomito
BY
Woodard, Weikart, Emhardt & Naughton
ATTORNEYS 3,675,972

STONE SLOTTING MACHINE

BACKGROUND OF THE INVENTION

1. Field of the Invention

This machine is in the field of cutting devices for stone, marble and similar material.

1. Description of the Prior Art

Various devices are used to cut and remove stone from the earth. For example, a rock-channeling machine is disclosed in U.S. Pat. No. 207,374 issued to Webster. A more recent device for cutting stone from the ground is to drop a heavy chisel thereby impacting the stone with great force and cracking or separating the stone. It can be appreciated, that this latter device and method does not result in great accuracy in cutting or separating the stone.

There is a need for a new improved machine for cutting slots into stone which is firmly attached to the ground. The machine should have a sufficiently long cutting device so as to enable large blocks of stone to be cut. The machine should allow the cutting to be accomplished quickly and easily and as a result of the requirement for a long cutting device, the device must be supported at various places in order to prevent breakage of the cutter.

SUMMARY OF THE INVENTION

The present invention is a stone slotting machine having a movable main carriage with an arbor frame pivotally mounted thereon. Bearings having an inner race and an outer race are mounted to the frame and receive cutting cylinders. Each cutting cylinder has a cylinder body with a male and female threaded end with shoulders surrounding each end and abutting against the inner races. Sealing rings mounted to the ends abut the outer races. The cutting cylinders are rotated and reciprocated.

It is an object of the present invention to provide a stone slotting machine with multiple cutting cylinders secured together by threaded ends held by bearings.

It is a further object of this invention to provide such a machine which also has a spring loaded bottom cutting tool.

Related objects and advantages of the present invention will be apparent from the following description.

BRIEF DESCRIPTION OF THE DRAWING

FIG. 1 is a perspective view of a stone slotting machine incorporating the present invention.

FIG. 3 is a fragmentary enlarged side view of the spring loaded cutting tool 63.

FIG. 4 is an enlarged view of another embodiment of a cutting tool 64.

DESCRIPTION OF THE PREFERRED EMBODIMENT

Figure 2:
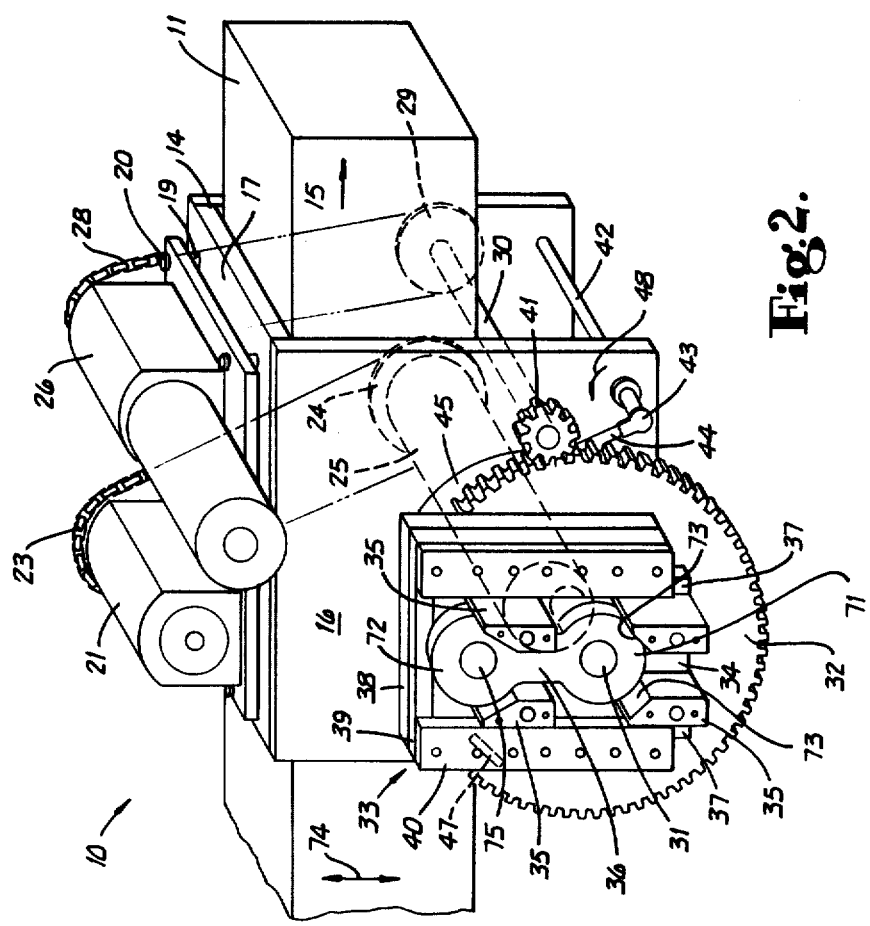
FIG. 2 is a perspective view of the machine of FIG. 1 with arbor 50 removed to more clearly illustrate the reciprocating and pivoting drive means.

For the purposes of promoting an understanding of the principles of the invention, reference will now be made to the embodiment illustrated in the drawing and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

The present invention is utilized to cut or grind a slot or channel in natural or artificial stone, marble, granite or like material, for the purpose of quarrying or removing same. The machine has a high speed arbor unit using diamonds or other abrasive material, bearings, guide rollers and a water attachment secured to a reciprocal feed unit. The high speed arbor with a reciprocal motion cuts a slot in the stone and is pivotable about a horizontal axis thereby allowing the arbor to be swung downward. The arbor may be locked in place after the desired position has been achieved.

Referring now more particularly to FIG. 1, there is illustrated a stone slotting machine 10 which is movably mounted to monorail 11 positioned above ground 13 by braces 12. A main carriage 14 is movable on monorail 11 in a direction toward or opposite of arrow 15. Carriage 14 has plates 16, 17 and 18 joined together with bearings provided between the plates and the monorail to allow ready movement of the carriage on the monorail. A motor mount 19 is secured to plate 17 by fasteners 20 and has motors 21 and 26 secured to its top. Motor 21 provides for the reciprocal motion of arbor 50 whereas motor 26 provides for the pivotal motion of arbor 50. Gear 22 is fixedly attached to the output shaft of motor 21 and is in meshing engagement with chain 23. A second gear 24 fixedly attached adjacent plate 18 to axle 25 is also in meshing engagement with chain 23. Axle 25 extends through plates 18 and 16 with bearings provided within the two plates to allow for relatively frictionless rotation of the axle. Thus, activation of motor 21 results in the rotation of axle 25. Likewise, a gear 27 is fixedly attached to the output shaft of motor 26 which provides for the pivotal motion of arbor 50. Gear 27 is in meshing engagement with chain 28. A second axle 30 extends through plates 18 and 16 which have bearings to ensure for relatively frictionless rotation of axle 30. A gear 29 is fixedly attached to the end of axle 30 being positioned adjacent plate 18 and is in meshing engagement with chain 28. Thus, activation of motor 26 results in the rotation of axle 30.

FIG. 2 is a perspective view of the stone slotting machine 10 with the complete arbor 50 removed to more clearly illustrate the reciprocating and pivoting drive means of the machine. Axle 25 extends through plate 16, brake drum 45 and gear 32. Drum 45 is fixedly attached to axle 25 so as to prevent relative motion between the axle and drum. A conventional brake band 44 is positioned around the upper portion of drum 45. One end of band 45 is fixedly attached to arm 43 which is mounted at one end to rod 42. The opposite end of band 45 is fixedly attached to leg 47 shown by dash lines in FIG. 2. Leg 47 is mounted to plate 16 and is positioned between gear 32 and plate 16. Thus, as rod 42 is rotated in the direction of arrow 48, band 45 will brakingly engage the drum 45. Of course, a variety of other methods may be used to prevent drum 45 from turning. For example, band 44 may extend completely around the drum. Axle 25 extends freely through gear 32 which has bearings to ensure relatively frictionless contact between the axle and gear 32. Integrally attached to the end of axle 25 is dog 31 which is offset from the longitudinal center axis of axle 25. Slide assembly 33 is fixedly attached to the outer surface of gear 32 by fastening devices. Slide assembly 33 has a back plate 38 fastened to a spacer 39 and retaining flanges 40. Slidingly received by assembly 33 is slide 34 having flanges 37 positioned between retaining flanges 40 and back plate 38. Slide 34 has four ears 35 which mountingly receive arbor 50. Fastening devices are used to secure the arbor to the four ears. Member 36 has two rounded ends 71 and 72 which abuttingly engage the beveled surfaces 73 of ears 35. Rounded end 71 is provided with bearings which freely receive dog 31. Thus, as axle 25 is rotated by motor 21, dog 31 will freely rotate within member 36. In addition, dog 31 will force member 36 to move back and forth in the direction of arrows 74 since dog 31 is offset from the longitudinal center axis of axle 25. Movement of member 36 will cause slide 34 to also move back and forth in the direction of arrows 74 being contained by slide assembly 33. Arbor 50 will reciprocate a given distance in the direction of arrows 74 since it is fixedly attached to ears 35. Rounded end 72 of member 36 has bearings for freely receiving pin 75 attached to back plate 38 and extending through end 72. Sufficient space is provided between retaining flanges 40 and rounded end 71 to allow dog 31 to move in a circle contained between the four ears 35.

Arbor 50 is pivoted about axle 25 by gear 41 fixedly mounted to the end of axle 30. Gear 41 is in meshing engagement with gear 32 at all times. Activation of motor 26 results in the rotation of gear 41 which thereby drives gear 32. Slide assembly 33 being fixedly attached to gear 32 is also rotated by gear 41 and forces slide 34 and arbor 50 to pivot about axle 25. Axle 25 extends freely through brake drum 45 and gear 32 whereas dog 31 extends freely through slide assembly 33, slide 34 and member 36. Arbor 50 may be pivoted a full 360°.

Referring now to FIG. 1, arbor 50 has a sheet 51 of high tensile aluminum or material of equal strength, the size being approximately one-half inch in thickness and approximately 3 feet and 6 inches in width at the top end. Rotatively mounted to plate 51 are cutting cylinders 52 being received by bearings 53 secured to plate 51 by flanges 54 and fasteners 76. Cylinders 52 are fixedly secured together and to rod 55 having wheel 57 fixedly mounted thereon. Rod 55 is rotatably received by thrust bearing flange 108 secured to plate 51. Wheel 57 is provided with grooves for receiving belts 58 which are received by wheel 77. Flanges 78 secured to plate 51 rotatably receive the axle of wheel 77 which is secured to wheel 60 also rotatably mounted by flanges 78. A second series of belts 59 are received by grooves provided in wheels 60 and 61. Motor 62 mounted to plate 51 has an output shaft with wheel 61 secured thereon. Thus, activation of motor 62 results in rotation of wheels 61, 60, 77 and 57 and cutting cylinders 52.

FIG. 3 is an enlarged view of cutting cylinder 49 shown connected to spring loaded cutting tool 63. Cylinder 49 is identical to cylinders 52. Strips of abrasive materials 66 (FIGS. 1 and 3) are fixedly fastened to each cylinder body 65. Material 66 may be any well known cutting material such as diamond teeth and is affixed to cylinder body 65 in strips spaced around the circumference and length of the cylinder. Cylinder body 65 has a male threaded end 70 (FIG. 3) for threadedly receiving the adjacent cutting cylinder body. Each cylinder body of cutting cylinders 49 and 52 has a male threaded end and a female threaded opposite end with a shoulder extending around each end. The shoulders abut against the inner races of the bearings. Each male threaded end has a column of relatively constant diameter receiving the inner race. The columns are integrally connected to the shoulders and have outer extremities which are tapered with threads provided thereon. The female ends are complementary to the tapered male ends. At the opposite end of cylinder body 65 are provided female threads 79 for receiving the male threaded end 95 of spring loaded cutting tool 63 or the male threaded end of an adjacent cutting cylinder. Channel 67 is circular and extends around threaded end 70 receiving a carbon sealing ring 69. Small helical springs 68 are provided between ring 69 and the bottom of channel 67 for loading the carbon ring against bearings 53 (FIG. 1). A similar circular channel 80, spring 81 and carbon sealing ring 82 surround the female threads 79 located at the opposite end of cylinder 65.

The coupling between spring loaded cutting tool 63 and cutting cylinder 49 will now be described it being understood that a similar description applies to the coupling between cylinders 49 and 52 and between adjacent cylinders 52. Tool 63 has a cylinder 85 fixedly attached to rod 89 which slidingly receives cylinder 87. Cylinders 85 and 87 have abrasive material strips 86 and 88 similar to abrasive material strips 66. A spring 90 is disposed between the mutually facing ends of cylinders 85 and 87 and is positioned on rod 89 spacing cylinders 85 and 87 apart. The spacing between cylinders 85 and 87 equals the distance the arbor is reciprocated. This spacing decreases when cylinder 87 is forced toward cylinder 85 by the bottom of the stone slot. Cylinder 85 has a male threaded end 95 for threadedly engaging the female threaded end 79 of cylinder 65. A channel 91, carbon sealing ring 93 and spring 92 are disposed about male threaded end 95 of cylinder 85. Rings 93 and 82 sealingly abut against the outer race of bearing 96 attached to arbor 50. Cylinders 65 and 85 have shoulders 84 and 94 spaced apart and abutting against the inner race 102 of bearing 96.

FIG. 4 is an enlarged view of cutting tool 49 attached to a second embodiment of a lower cutting tool. Cutting tool 64 is not spring loaded as cutting tool 63 and a cylinder 97 with strips of abrasive material 98 is fixedly attached thereto. Tool 64 is attached to cutting cylinder 49 in a manner similar to the attachment of cutting tool 63 to cylinder 49. The abrasive material on cylinders 87 and 97 extends approximately one-eighth inch beyond the cylinder as shown at locations 99 and 100. The outside diameter of the cylinders is one-sixteenth inch greater than the diameter of bearing 96 in order to allow the diamond teeth or abrasive material to cut the stone. As previously mentioned, the shoulders of each cutting cylinder and tool abut against the inner race of the bearing thereby utilizing the race which helps strengthen the overall cutting device. The carbon seals abutting against the outer race of the bearing prevent water or moisture from entering the bearing thereby preventing degradation of the bearing.

Arbor 50 (FIG. 1) has water pipes 103 secured to the front face of plate 51. Pipes 103 route water to perforated pipes 104 mounted to plate 51 along the length of cutting cylinders 52 and 49 and cutting tool 63. The water from pipes 103 exits the perforations on pipes 104 thereby cleaning the cutting cylinders and tools during the cutting operation. A suction pipe 105 is mounted to plate 51 by suitable fastening devices and extends down to the tip of the arbor. Pipe 105 is connected to a suction pump and is opened at end 106 to extract the slush from the cutting channel formed by the cut stone and water. Conventional roller bearings 107 are rotatably mounted to plate 51 and protrude out of both side surfaces of the plate thereby guiding arbor 50 in the channel. The roller bearings help to maintain a straight vertical or horizontal channel.

Figure 5:
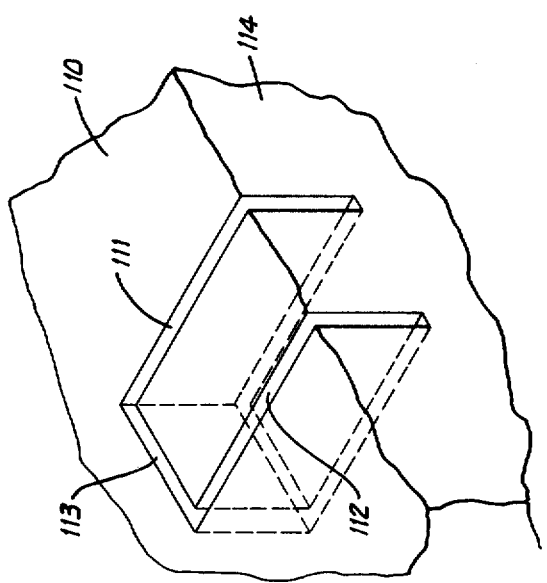
FIG. 5 is a fragmentary perspective view of the stone slots produced by the machine of FIG. 1.

To operate the stone slotting machine, the machine is moved horizontally on the monorail to the desired position. This is accomplished by a standard motor-chain combination which has not been shown in the drawing. Arbor 50 may then be pivoted by motor 26 to the desired position. For example, if a vertical slot is desired, the arbor should be pivoted as shown in FIG. 1 so that the cutting cylinders are in a vertical position. The cutting cylinders and tools are then rotated by motor 62 at approximately 5,000 revolutions per minute. Simultaneously, arbor 50 is reciprocated vertically by motor 21 at an approximate rate of 40 cycles per minute. The reciprocation allows the stone adjacent bearings 53 and 96 to be cut away by the cutting cylinders and tools. It can be appreciated that if arbor 50 is not reciprocated, then the stone will not be cut that is adjacent to bearings 53 and 96. Brake band 44 allows arbor 50 to be locked in the desired position. Thus, the brake band would be applied to lock the arbor in the vertical direction and prior to initiating the rotation and reciprocation. Water is provided over the cutting surfaces of the cutting cylinders and tools washing the cut stone away which is withdrawn by the suction pipes. Once a slot has been cut into the stone, similar slots may be cut by the machine until a block of stone is attached to the ground only on its bottom side. Conventional wedges may then be used to break the block of stone from the ground and the block may then be lifted by a crane or a hoisting device. FIG. 5 is a perspective view of the side of a stone cliff 114 having slots 112, 113 and 111 cut into ground 110 by the machine disclosed herein. At high cutting speeds it is necessary to replace the solid cutting tool 64 (FIG. 4) with the spring loaded cutting tool 63. It can be appreciated that as the arbor is reciprocated vertically, horizontal movement of the arbor is also occurring as the stone is cut. Thus, as the arbor is reciprocated in the upward direction, a portion of the bottom side of the channel will not be cut since the bottom cutting tool is lifted upward. Thus, spring loaded cutting tool 63 is used which keeps cylinder 87 positioned at the bottom of the slot. The spacing between cylinders 87 and 85 is the same distance as the reciprocal motion distance. If the cylinder rods and cutting tools are being rotated at a slow speed, then solid cutting tool 64 may be used since the arbor does not progress horizontally through the stone sufficiently as to allow a stone build up at the bottom of the slot.

Many variations in the present machine are contemplated and included in the present invention. For example, it would be possible to provide a solid cutting shaft extending the entire length of arbor 50 in lieu of the individual cutting cylinders. In addition, it would be possible to mount the movable carriage 14 on a train movable across the ground on rails in lieu of on the monorail illustrated and described.

It will be evident from the above description that the present invention provides a machine which is operable to cut slots into stone quickly and easily. It will be further evident from the above description that this machine is operated in such a way so as to cut all of the stone in front of the cutting edge of the machine.

While the invention has been disclosed and described in some detail in the drawings and foregoing description, they are to be considered as illustrative and not restrictive in character, as other modifications may readily suggest themselves to persons skilled in this art.

The invention claimed is:

1. A stone slotting machine comprising:
   a movable main carriage;
   an arbor frame pivotally mounted to said carriage;
   bearings each having an inner race and an outer race, said bearings being mounted to said frame;
   cutting cylinders attached and aligned together and being rotatably mounted to said frame by said bearings, each of said cutting cylinders having a cylinder body with a male threaded end and a female threaded opposite end with a shoulder extending around each end, each of said shoulders abut against said inner races;
   sealing rings mounted to said ends being positioned around and outward of said shoulders, said rings sealingly abut against said outer races;
   first means operable to rotate said cutting cylinders; and,
   second means operable to reciprocate said cutting cylinders over a given distance.

2. The machine of claim 1 additionally comprising:
   a spring loaded cutting tool having an upper cutting portion connected to an end of one of said cutting cylinders, said tool also having a bottom cutting portion and a rod fixedly connected to said top portion and slidably receiving said bottom portion, said tool having a spring positioned around said rod spacing said top and bottom portions apart.

3. The machine of claim 2 wherein:
   said spacing between said top and bottom portions of said cutting tool equals said distance said second means reciprocates said cylinders 4. The machine of claim 3 wherein:
   said ends of said cylinder bodies have circular channels surrounding said shoulders, said ends receiving said sealing rings; and further comprising:
   helical springs positioned in said channels abutting against said rings.

5. The machine of claim 4 wherein:
   said male threaded end has a column of relatively constant diameter receiving said inner race and being integrally connected to said shoulder, said male threaded end has an outer extremity of tapering diameter with threads thereon; and,
   said female threaded end has a cavity complementary in shape receiving said outer extremity of one of said male threaded ends.

6. The machine of claim 5 and further comprising:
   rollers mounted to and extending through said frame;
   perforated water pipes mounted to said frame; and,
   suction means mounted to said frame.

* * * * *